Figure 1:
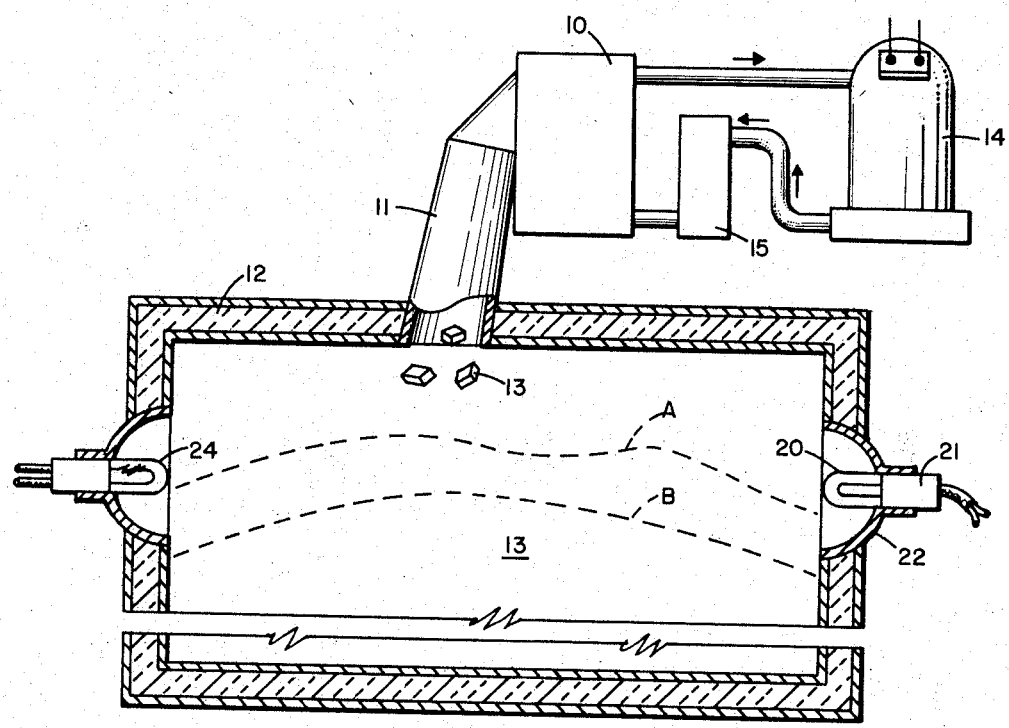

May 30, 1967

J. L. LORENZ 3,322,959

PHOTOELECTRIC LEVEL CONTROL SYSTEM WITH LAMP
OPERATED AT ALTERNATE BRIGHTNESSES

Filed May 9, 1963

INVENTOR.
JEROME L. LORENZ
BY
ATTORNEY

United States Patent Office 3,322,959
Patented May 30, 1967

3,322,959
PHOTOELECTRIC LEVEL CONTROL SYSTEM WITH LAMP OPERATED AT ALTERNATE BRIGHTNESSES
Jerome L. Lorenz, Columbus, Ohio, assignor to Ranco Incorporated, Columbus, Ohio, a corporation of Ohio
Filed May 9, 1963, Ser. No. 279,241
8 Claims. (Cl. 250—218)

The present invention relates to an improved system for controlling the level of a particulate material producing or applying apparatus, such as an ice cube making machine, so as to periodically operate the apparatus to maintain a reservoir of material between minimum and maximum levels, the control system comprising means projecting a beam of light, or like energy, across the storage bin at the material level desired and onto a light sensitive element which responds to an increase in light intensity, as occurs by a receding of the level of the material from the path of the beam, to initiate operation of the apparatus and which terminates operation of the apparatus in response to a decrease in light intensity occasioned by blockage of the light beam by the accumulation of material in the path of the beam.

A principal object of the invention is the provision of an improved control system of the type mentioned in which means is provided for substantially increasing the intensity of the light or energy beam during the period in which material is discharging into the storage bin and reducing the intensity during the idle period so that a greater area of the path of the beam must be obstructed by the accumulating material to cause termination of the discharging of material than would be required if the light intensity was constant and as a result a substantial change in level of the material in the storage bin will be required to cause operation of the control system. Thus, the apparatus supplying the material will be operated in cycles which are of sufficient duration as to be most efficent for long and trouble-free service of the apparatus.

It is a further object of this invention to provide a material level responsive photoelectric control means utilizing inexpensive solid state components such as light activated switches, diodes, and the like, so as to provide a particularly economical and reliable level sensing control circuit.

Yet another object of this invention is the provision of a photoelectric level control of the foregoing character wherein the voltage on the incandescent lamp is reduced during the off phase of operation so as to significantly reduce the consumption of electricity and the generation of undesirable radiant heat energy in the vicinity of the storage bin, while at the same time prolonging the useful life expectancy of the lamp.

Still another object of this invention is to accomplish the objects mentioned hereinbefore through the provision of a novel photoelectric circuit comprising an incandescent lamp which is normally energized to provide a relatively dim light beam by half wave rectified current of one phase from an alternating current supply, the lamp and a load controlling relay being connected to the alternating current source through a light activated switch which is normally non-conductive but which acts as a rectifier when subjected to the dim light and is oriented to pass half wave current of the opposite phase, whereby the relay is actuated and the lamp is energized by full wave current to provide a relatively bright light which acts to sustain the resulting "on" condition. Conversely, when material accumulates such as to block the light beam sufficiently to cause the light activated switch to become non-conductive, the relay is deenergized and the lamp returned to its half power or dim state thereby tending to sustain the "off" condition by requiring a substantial reduction in level of the material to enable the light activated switch to respond to reenergize the relay.

Figure 2:
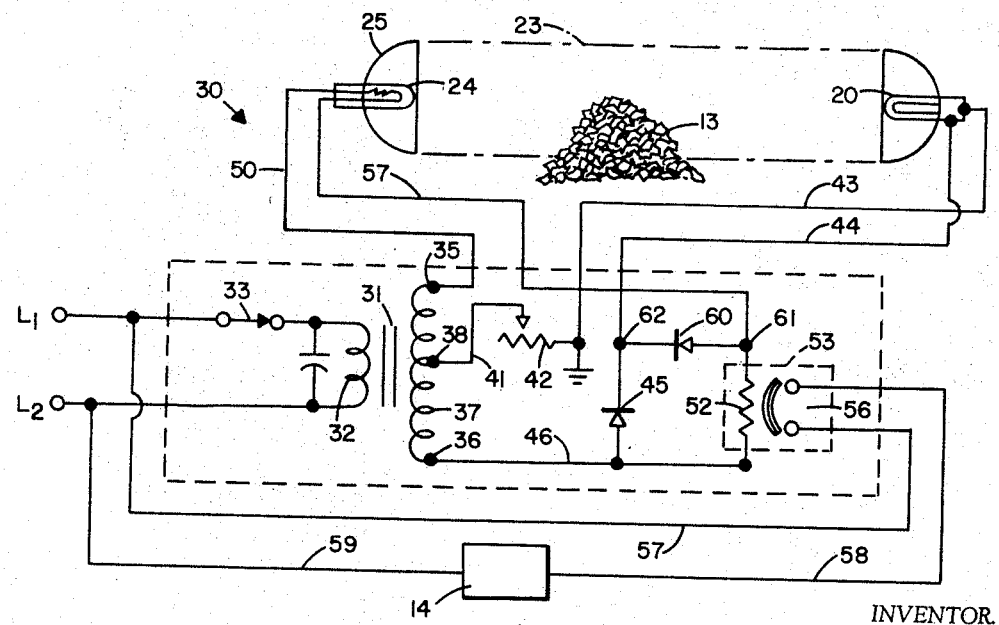

The invention further resides in certain combinations and arrangements of parts by which the foregoing objects and advantages, as well as others, are obtained as will become apparent from the following detailed description of a preferred embodiment read in conjunction with the accompanying sheets of drawings forming a part of this specification, and in which FIG. 1 is a vertical sectional view of an ice bin shown in association with an ice making machine and illustrating a light source and light activated switch mounted in the ice bin; and FIG. 2 is a schematic illustration of a photoelectric control circuit embodying the present invention.

In the drawings, there is shown an ice making machine 10 for manufacturing particulate ice and comprising a chute 11 connected to an insulated ice bin 12 in which the particulate ice 13 may be accumulated and stored for future use. The ice machine 10 may be of any type which may be electrically controlled, many of which are well known in the art to which the invention pertains. In this instance, the ice machine 10 is shown as comprising an electrically operated motor compressor unit 14 and a condenser 15 which are connected by suitable tubing to an evaporator housed within the machine 10 to form a conventional compressor-condenser-expander circuit.

When the motor-compressor unit 14 is energized, the ice machine 10 manufactures ice in a particulate form, discharging it through chute 11 and into the bin 12. At one side of the bin 12 there is provided a light source in the form of an incandescent lamp 20 mounted in a suitable electric socket 21 which is provided with a light focusing reflector 22. The lamp 20 and the reflector 22 form a beam of light 23 which is directed across the bin so as to include upper and lower levels A and B indicated by broken lines in FIG. 1, and which is received in a light condenser 25 which concentrates the beam on a light activated switch 24 disposed in the condenser. The light activated switch 24 is a controlled rectifier device which is normally non-conductive but may be triggered by light energy rather than a gating voltage to a unidirectional conductive state. An example of such a light activated switch is that designated as ZJ235 and which may be obtained from the General Electric Company.

The lamp 20 and the light activated switch 24 form part of an electric control circuit 30 for the ice machine 10, which circuit is disposed at the opposite side of the bin and described more fully hereinafter, and effects energization of the compressor 14 of the ice machine 10 whenever the light beam 23 is substantially unobstructed, such as when the bin 12 has been emptied of ice or the accumulation of ice has been reduced by normal melt away to the lower level B indicated by the dotted line in FIG. 1 and which maintains the energization of the ice machine 10 until the accumulation of ice intercepts and substantially disrupts the light beam 23, as will occur when the ice reaches the upper level A indicated by the dot and dash line of FIG. 1, and which upper level is appreciably above the lower level B.

Referring now to FIG. 2, the control circuit 30 comprises a power supply transformer 31, the primary winding 32 of which is connected through a suitable line switch 33 to alternating current power lines L1 and L2 carrying 115 volts A.C., for example.

The transformer 31 reduces the voltage to a level which is compatible with inexpensive semi-conductive elements, for example to 24 volts A.C. appearing across the end terminals 35 and 36 of the secondary winding 37 of the transformer. The secondary winding 37 has a center tap 38 providing an alternating current of 12 volts potential with respect to either end terminal 35 or 36.

The lamp 20 which is designed for operation at 12 volts, is normally energized by a circuit which may be traced from the center tap 38 through a conductor 41, a variable resistance or brightness adjusting rheostat 42, a conductor 43, lamp 20, a conductor 44, a diode type rectifier 45, and a conductor 46 to the transformer end terminal 36. On those half cycles when terminal 36 is positive with respect to center tap 38, rectifier 45 passes half wave rectified current to the lamp 30 which is thereby normally energized at about half its rated power. The lamp 20 normally casts a relatively dim light beam 23 toward the light activated switch 24, the intensity of which beam may be varied somewhat by the brightness adjusting rheostat 42 for a reason which will become apparent as the description proceeds.

The light activated switch 24 controls a relay circuit which may be traced from the transformer secondary end terminal 35 through a conductor 50, the light activated switch 24, a conductor 51, a resistance heater 42 of a heated bimetal type time delay relay 53, and a conductor 46 to the transformer end terminal 36. When the light activated switch 24 is triggered or activated to a conductive condition it passes current during those half cycles when the transformer end terminal 36 is positive with respect to terminal 36. The heater 52 of relay 53 is therefore energized with half wave rectified current at substantially the full 24 volts appearing across the transformer terminals 35 and 36, this being sufficient to actuate the relay. The relay may be of any well known type such as heated bimetal or electromagnetic, but is advantageously of the time delay type when the apparatus controlled includes a compressor for which several minutes should be allowed to permit unloading of head pressure before reenergizing the compressor motor. In the present example the relay 53 has load controlling contacts 56 which, when closed, establish a circuit which may be traced from power line L1 through a conductor 57, the contacts 56, a conductor 58, the motor compressor 14, and a conductor 59 to power line L2.

A second rectifier 60 is connected from the junction 61 between the light activated switch 24 and the relay 53 to the junction 62 between the lamp 20 and the rectifier 45. The rectifier 60 is oriented in opposition to the rectifier 45 so that during those half cycles when rectifier 45 blocks current flow to the lamp 20, and when the light activated switch 24 has been triggered into conductive state, the rectifier 60 and the light activated switch 24 will cooperate to pass half wave rectified current through the lamp 20 at substantially the 12 volts potential between terminals 35 and center tap 38. Accordingly, when the light activated switch 24 is in its conductive state the lamp 20 will be energized by full wave rectified current at approximately 12 volts thereby increasing the intensity of the beam 23 directed toward the switch 24 by the lamp 20.

A capacitor 65 is preferably connected across the primary winding 32 of the supply transformer to protect the light activated switch 24 and the rectifiers 45 and 60 from transients generated in the transformer when the control circuit is turned on or off.

The operation of the apparatus will now be described.

Assuming the storage bin 12 to be empty and the line switch 33 to be open, the relay 53 will be in a deenergized condition and the motor-compressor unit 14 idle. Upon closing the line switch 33, and with the brightness rheostat 42 set to provide its maximum resistance, the lamp 20 will be energized by half wave rectified current passed by rectifier 45 during those half cycles when the transformer end terminal 36 is positive with respect to the center tap 38. The rheostat 42 may then be adjusted to increase the brillance of lamp 20 until the intensity of the beam 23 is sufficient at half power or half wave energization of the lamp to trigger the light activated switch 24 into its current rectifying conductive condition. Activation of the light activated switch 24 will result in passing of an additional half wave rectified current through lamp 20 via the light activated switch 24 and the rectifier 60 during those half cycles when the transformer terminal 35 is positive with respect to the center tap 38. Accordingly, the power energizing the lamp 20 is increased from half wave rectified current to full wave rectified current by the combined effects of the rectifiers 45 and 60.

This causes the lamp to brighten, increasing the light energy falling on the light activated switch, and thereby tending to sustain the activated condition of the light activated switch.

The activation of the light activated switch 24 also completes the above described circuit through the heater 52 of the relay 53, closing the contacts 56 thereof to energize the motor-compressor 14 and initiate an ice manufacturing cycle of the machine 10. The operation of the ice manufacturing machine 10 will continue until the ice 13 in the bin 12 accumulates to a level where the interference of the ice with the beam 23 reduces the light falling on the light activated switch 24 below its cut-off threshhold, this level of ice being indicated as the upper dot and dash line A in FIG. 1 and being appreciably above the lower level B.

Upon deactivation of the light activated switch 24, the half wave rectified current passing through lamp 20 by way of rectifier 60 is interrupted returning the lamp 20 to half power energization by the half wave rectified current supplied through rectifier 45, thereby dimming the lamp 20. Simultaneously with dimming of the lamp 20 the interruption of current flow by the light activated switch 24 completely deenergizes the heater 52 of relay 53, thereby opening the contacts 56 thereof and terminating energization of the motor-compressor 14 and the manufacturing cycle of the ice machine 10.

Because the lamp 20 is again operating at half power and the intensity of beam 23 is reduced, the presence of ice 13 prevents reactivation of the light activated switch 24 until the ice has been reduced by removal from the bin 12 or by normal melt away to a lower level such as that indicated by the dotted line B. At that time the light activated switch 24 will be again triggered into conductivity to increase the brilliance of the lamp 20 and to energize the relay 53 to initiate another ice manufacturing cycle.

Because the lamp 20 is increased in brilliance upon the initiation of each ice manufacturing cycle and is dimmed on the termination of each ice manufacturing cycle, it will be recognized that there results an appreciable spread between the cut-off level A and the initiating level B thereby eliminating short cycling of the ice manufacturing apparatus due to normal melt away or the removal of a small amount of ice and, in addition, the increasing and decreasing of the brilliance of the lamp 20 produces a convulsive or regenerative effect at initiation and termination thereby preventing flickering of the light and assuring positive operation of the ice making apparatus.

In the present example wherein the control circuit of this invention is utilized to actuate a motor compressor of a refrigeration or ice making circuit, it is preferable that the relay 53 be of the time delay type requiring two or three minutes energization before closing of the load controlling contacts so as to permit unloading of the compressor section of the motor-compressor and thereby preventing damage thereto in the event the bin 12 is emptied immediately after cut-off by accumulation of the ice to the level A.

Of course, the control circuit of this invention may be utilized to control the accumulation of other materials than ice, and in those instances where no time delay between cut-off and energization of the load is required, an ordinary magnetic relay may be employed instead of the time delay relay of the present example.

Accordingly, although the present invention has been described in considerable detail with reference to a specific photoelectric control circuit embodying the present invention, it will be understood that the invention is not limited thereto but rather the invention includes all those modifications, adaptations, substitutions and uses as are reasonably embraced by the scope of the claims hereof.

Having described my invention, I claim:

1. A photoelectric control means comprising in combination:
   (a) a light source,
   (b) means for normally energizing said light source to provide a beam of first intensity,
   (c) a light activated switch mounted to receive said beam and having a threshold of activation below said first intensity,
   (d) load means connected to be energized by activation of said light activated switch, and
   (e) means to control the intensity of said light source in response to activation of said light activated switch to increase the intensity of said beam and responsive to deactivation of said switch to reduce the intensity of said beam to said first intensity, whereby an appreciable change in interference with said light beam is necessary to change the state of activation of said light activated switch and energization of said load means.

2. An ice bin level control circuit for operating an ice machine to maintain ice between upper and lower levels in the bin,
   (a) a light source disposed at one side of said bin,
   (b) means for normally energizing said light source to provide a beam of first intensity projected across said bin and between said levels,
   (c) a light activated switch mounted to receive said beam and having a threshold of activation below said first intensity,
   (d) means connecting said ice machine for energization thereof by activation of said light activated switch,
   (e) said light source being responsive to activation of said light activated switch to increase the intensity of said beam, and responsive to deactivation of said switch to reduce the intensity of said beam to said first intensity, whereby an appreciable change in interference with said light beam is necessary to change the state of activation of said light activated switch and the energization of said ice machine.

3. Photoelectric control circuit comprising:
   (a) an electrically actuated relay switch for controlling a load,
   (b) a light source including an incandescent lamp mounted so as to cast a beam of light,
   (c) a current rectifying light activated switch mounted to receive light energy from said lamp,
   (d) power supply means for providing alternating current of a first potential across first and second terminals, and including a center tap for providing a reduced alternating current potential between said center tap and either end terminal,
   (e) said light activated switch and said relay being connected in series across said first and second terminals of said power supply means,
   (f) said lamp being connected in series with a first rectifier between said center tap and said second terminal,
   (g) a second rectifier connected between the junction of said first rectifier with said lamp and said first terminal to permit current flow through said lamp on alternate half cycles.

4. A photoelectric control circuit comprising:
   (a) an alternating current supply transformer having a secondary winding having first and second end terminals providing a first potential thereacross, said winding including a center tap providing a lesser potential with respect to said end terminals,
   (b) a current rectifying light activated switch connected in series with a relay between said first and second terminals, said switch being operative when actuated to energize said relay with half wave current at said first potential,
   (c) an incandescent lamp connected in series with a first rectifier between said center tap and said first end terminal so that said lamp is normally energized by half wave current at said lesser potential to direct light at a first intensity on said light actuated switch, and
   (d) a second rectifier connected from the junction between said light activated switch and said relay to the junction between said lamp and said first rectifier, said first and second rectifiers being connected in opposite polarity whereby upon activation of said light activated switch said lamp is energized with full wave current at said lesser potential to direct light at a greater intensity on said light activated switch,
   (e) said light activated switch being activated by light of said first intensity and deactivated upon reduction of light intensity to a threshold value appreciably below said first intensity.

5. A photoelectric control circuit as defined in claim 4, and wherein said relay comprises a heated bimetal time delay relay.

6. An ice bin level control circuit for operating an ice machine to maintain ice between upper and lower levels, said circuit comprising:
   (a) an alternating current source,
   (b) a lamp adapted to direct a light beam across the bin at said levels and connected in circuit with said current source and including a series connection with a first rectifier for energization by a first half wave current to provide a relatively dim beam across said bin and within the planes of said levels,
   (c) a current rectifying light activated switch on the side of said bin opposite said lamp for receiving light energy from said beam and activable by said dim beam when ice falls below said lower level,
   (d) a load relay energizable by activation of said light activated switch to initiate manufacture of ice, and
   (e) means responsive to said light activated switch for connecting said lamp with the second half wave current from said source to energize said lamp with said second half wave rectified current and increase the brilliance thereof to a relatively bright beam,
   (f) whereby upon an appreciable increase in the level of ice to said second level so as to interfere with said light beam, said light activated switch will be deactivated to terminate energization of said load relay and reduce said lamp brightness to said dim beam.

7. A photoelectric control means for regulating the level of materials stored in a given area and comprising in combination, a light sensitive element, means directing a beam of light through a given path and across said area and onto said element, control means actuated to alternate control conditions by said element in response to an increase and decrease respectively in intensity of said light source, and means to increase the intensity of said light source when said control means is in one of said alternate control conditions and to decrease the intensity of said light source when said control means is in the other of said control conditions.

8. A photoelectric control means for regulating the operation of apparatus for discharging materials into a storage area and comprising in combination:
   (a) a light sensitive element positioned at one side of said area,
   (b) means directing a beam of light across said area and onto said element, whereby materials accumulating in said area interfere with said beam as the level of the material reaches a given height, (c) control means for said apparatus responsive to an increase in intensity of said light source falling on said element to effect discharge of materials into said area by said apparatus and responsive to a decrease in intensity of light striking said element to effect termination discharge of material into said area by said apparatus, and (d) means to increase the intensity of said light source when said control means is operative to effect discharging of materials and to decrease the intensity of said light source when said control means is effective to terminate discharge of materials into said area.

References Cited

UNITED STATES PATENTS

| | | | |
|---|---|---|---|
| 2,269,442 | 1/1942 | Dench | 250—205 X |
| 2,849,622 | 8/1958 | Gridley | 250—205 |
| 2,896,125 | 7/1959 | Morton | 315—200 |
| 2,970,221 | 1/1961 | Jackson | 250—218 |
| 2,997,630 | 8/1961 | Kruse | 250—205 X |
| 3,087,066 | 4/1963 | Keogh | 250—206 |
| 3,128,384 | 4/1964 | Nelson | 250—205 |

RALPH G. NILSON, *Primary Examiner.*

E. STRICKLAND, M. ABRAMSON,
*Assistant Examiners.*